United States Patent [19]
Lang

[11] Patent Number: 6,118,403
[45] Date of Patent: Sep. 12, 2000

[54] SPEED TRAP INFORMATION SYSTEM

[76] Inventor: Brook Lang, 16149 Redmond Way, Suite 390, Redmond, Wash. 98052

[21] Appl. No.: 09/382,217

[22] Filed: Aug. 24, 1999

Related U.S. Application Data

[60] Provisional application No. 60/108,362, Nov. 13, 1998.

[51] Int. Cl.[7] .............................................. H04B 7/185
[52] U.S. Cl. ............................. 342/357.09; 342/357.06; 342/20; 342/28
[58] Field of Search ...................... 342/357.06, 357.09, 342/357.1, 20, 27, 28, 114; 701/213

[56] References Cited

U.S. PATENT DOCUMENTS

| | | | |
|---|---|---|---|
| 4,090,195 | 5/1978 | Guennou et al. | 343/5 PD |
| 4,622,553 | 11/1986 | Baba et al. | 342/91 |
| 4,668,952 | 5/1987 | Imazeki et al. | 342/20 |
| 4,791,420 | 12/1988 | Baba | 342/20 |
| 5,315,302 | 5/1994 | Katsukura et al. | 342/20 |
| 5,319,351 | 6/1994 | Beezley, Jr. | 340/426 |
| 5,334,969 | 8/1994 | Abe et al. | 340/426 |
| 5,515,042 | 5/1996 | Nelson | 340/937 |
| 5,977,884 | 11/1999 | Ross | 340/936 |

*Primary Examiner*—Thomas H. Tarcza
*Assistant Examiner*—Dao L. Phan
*Attorney, Agent, or Firm*—Dean A. Craine

[57] ABSTRACT

A system that provides information to authorized users regarding the location of speed traps via a wireless communication network connected to a computer wide area network. The system includes the use of a detector for speed detecting equipment, such as a radar detector, which detects the presence of speed detecting equipment and transmits the detection information into an electronic device in the motor vehicle. The electronic device communicates is coupled to a physical location device, such as a GPS receiver, which provides the specific location and direction of the motor vehicle when detection occurs. The electronic device is also coupled to a wireless modem that connects to a wireless communication network and to the wide area network. Connected to the wide area network is a central server that receives uploaded information from a plurality of other motor vehicle operators to create a large information database. Authorized users are then able to log into the central server and download information regarding the location of the speed detecting equipment operating in a specific roadway.

19 Claims, 1 Drawing Sheet

SPEED TRAP INFORMATION SYSTEM

This is a utility patent application based on a provisional patent application (Serial No. 60/108,362) filed Nov. 13, 1998.

BACKGROUND OF THE INVENTION

1. Field of the Invention

A system for monitoring and broadcasting information on the location of motor vehicle speed traps to motor vehicle operators.

2. Description of the Related Art

Motor vehicle radar and laser detectors are commonly used today to warn drivers that their motor vehicle speed is being monitored by law enforcement personnel. In many instances, such detectors do not detect the presence of speed detecting equipment until the motor vehicle is in direct view of the speed detecting equipment. When a warning signal from the detector is generated, it is normally too late to adjust the motor vehicle's speed to the posted speed limit.

Motor vehicle drivers that travel over the same route soon learn the location of law enforcement personnel operating speed detecting equipment. Such locations are commonly known as speed traps. One method used by law enforcement personnel to maintain an element of surprise for returning drivers is to frequently move their location. As a result, a "cat and mouse" game develops between motor vehicle drivers and law enforcement personnel.

Recently, various automobile manufacturers have begun offering computer communication systems installed in their motor vehicles capable of communicating with different kinds of positioning systems, including global positioning system (GPS) satellites. The motor vehicle occupants are then able to use these systems to receive information regarding their specific location, specific driving directions to a desired destination, and traffic conditions on a particular roadway.

Another recent development is the use of the wide area network, such as the INTERNET, by occupants in a motor vehicle via a wireless communication network. When connected to the network, information can be instantaneously uploaded and downloaded from the wide area network while riding in the motor vehicle.

SUMMARY OF THE INVENTION

It is an object of the present invention to provide a speed trap information system for motor vehicle occupants.

It is another object of the present invention to enable the speed trap information to be obtained nearly instantaneously and to be continuously updated. These and other objects of the present invention are met by a system that provides information to occupants in a motor vehicle regarding the location of speed traps via a computer connected via a wireless communication network to a central server connected to wide area network. The system uses a plurality of monitoring motor vehicles that include means for automatically or manually detecting the presence of speed detecting equipment operating nearby by law enforcement personnel. Located inside each monitoring vehicle is an electronic device that receives the detection information. A physical location means is coupled to the electronic device that establishes the specific location and direction information of the motor vehicle at the moment a detection signal is received. An optional verification means is also provided which enables the user to manually verify that the detection information is generated from speed detecting equipment. The electronic device is connected to a wireless communication network which enables all of the information listed above to be uploaded and downloaded from a wide area computer network, such as the INTERNET.

During use, the electronic device instantaneously or at selected intervals uploads specific location and time of detection information via the wireless communication network to the wide area network. A central server is connected to the wide area network which receives information from a plurality of monitoring motor vehicles. The central server then creates a database for different roadways throughout a region. Authorized users are then able to connect to the wide area network and log onto the central server and request information from the data bank regarding the location of speed detection equipment on desired roadways. The requested information can then be downloaded to the users via the wireless communication means or a standard telephone communication network.

DESCRIPTION OF THE PREFERRED EMBODIMENT(S)

Figure 1:
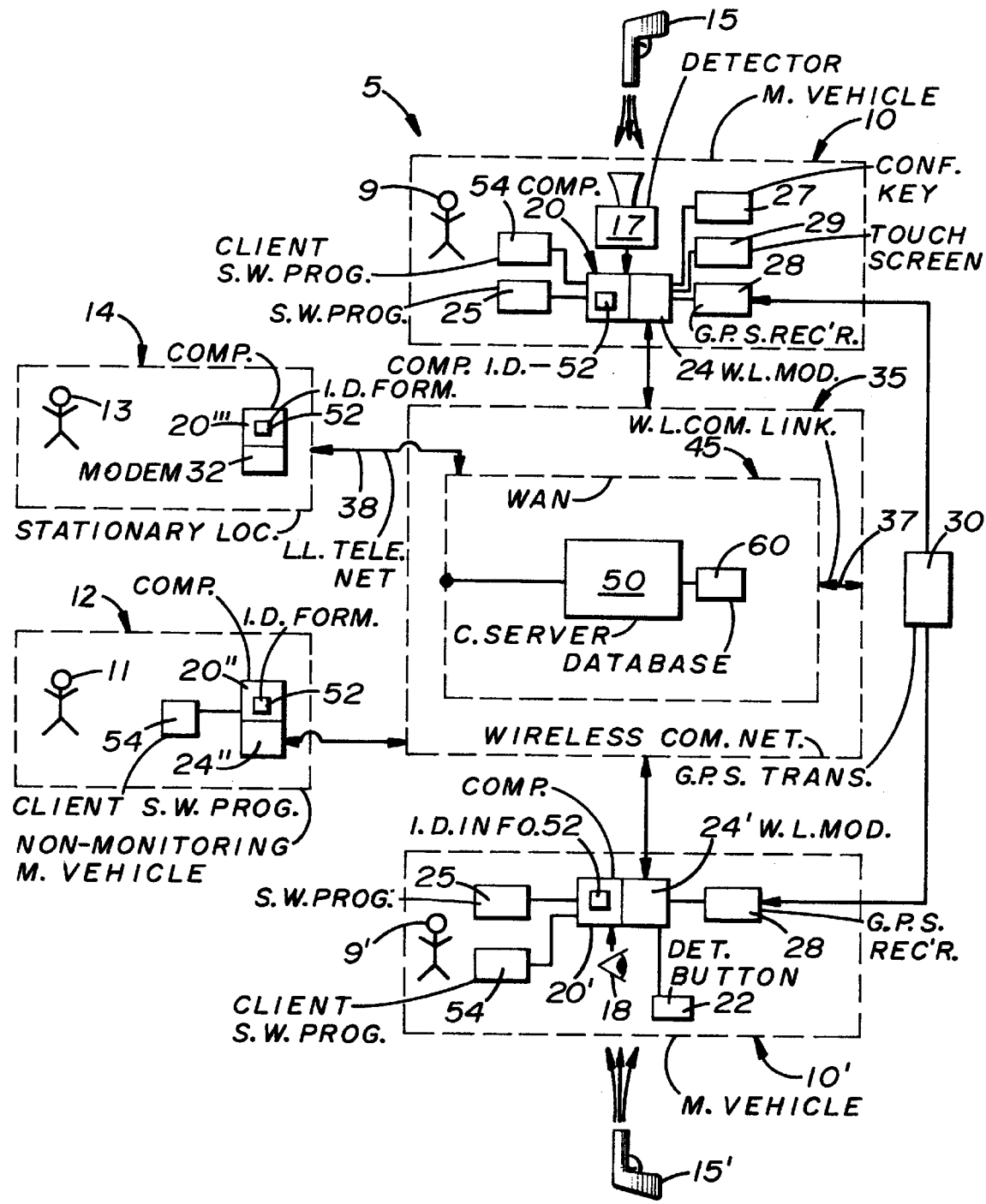
FIG. 1 is a schematic of the speed trap information system.

As shown in FIG. 1, a speed trap information system 5 is provided for informing authorized users of the past, present or possible future locations of speed detecting equipment located along roadways they currently or intend to travel. More specifically, authorized users operate a computer 20 to connect to a wide area network 45 which downloads past, present or possible future locations of speed detecting equipment 15, 15' operated by local traffic control personnel along a desired roadway from a central server 50 connected to the wide area network 45.

The system 5 uses a plurality of monitoring motor vehicles 10, 10' which detect and transmit to the central server 50 information regarding the location of speed detecting equipment 15, 15', respectively, operated by law enforcement personnel along various roadways. Each monitoring motor vehicle 10, 10' includes a computer 20, 20', respectively, capable of receiving input information from a means capable of detecting speed detecting equipment 15, 15' operated nearby. Each computer 20, 20' is also connected to a physical location means which provides real time, specific location, and direction information of the monitoring motor vehicle 10, 10' at the moment detection information is received from the speed detecting equipment detector means. Each computer 20, 20' then uploads the detection information, physical location information, and the time information via a wireless communication network 35 to the wide area network 45.

The system 5 also includes a central server 50 connected to the wide area network 45 which collects the uploaded information from a plurality of monitoring motor vehicles 10, 10' in a region to create a large database 60. Authorized users may connect to the central server 50 through the wide area network 45 and download selected information from the database 60 regarding the location of the speed detecting equipment 15, 15' currently or recently operated along specific roadways they are currently traveling or intend to travel.

FIG. 1 shows a first user 9 of the system 5 located in a first monitoring motor vehicle 10 and a second user 9' located in a second motor vehicle 10'. FIG. 1 also shows a third user 11 located in a non-monitoring motor vehicle 12 and a fourth user 13 located in a stationary building 14. All the users, 9, 9', 11, 13 are shown using a computer 20, 20', 20", 20'", respectively, or a similar electronic device, all capable of connecting to the wide area network 45 and to the central server 50 also connected to the wide area network 45. The computers 20, 20' and 20" located inside the motor vehicles 10, 10' and 12, respectively, are connected to a wireless modem 24, 24' and 24", respectively, all capable of connecting to the wireless communication network, generally referred to as 35. Each wireless communication network 35 may be connected to the wide area network 45 via a landline or wireless communication link, generally referred as 37. In the stationary structure 14, the computer 20'" is connected to a standard analog modem 32 which is connected to the wide area network 35 via a landline telephone network 38.

Each monitoring motor vehicle 10, 10' includes a physical location indicating means which establishes the location of the monitoring motor vehicle when detection of the speed detection equipment 15 or 15' occurs. In the preferred embodiment, each physical location indicating means is a global positioning satellite receiver 28 which receives global coordinate information from transmitters 30 located in overhead satellites.

The global positioning system (GPS) is a location system based on a constellation of twenty-four satellites orbiting the earth at altitudes of approximately 11,000 miles. The GPS satellites provide accurate positioning information twenty-four hours per day, anywhere in the world. GPS uses a receiver which stores orbit information at all GPS satellites. During use, a land-based receiver determines the time and the positions of the overhead satellites and then calculates the amount of time it takes a GPS radio signal to travel from the satellites to the receiver. By measuring the amount of time it takes for a radio signal to travel from the satellites, the exact location of the GPS receiver can be determined. GPS receivers 28 are available from Corvallis Microtechnology, Inc., in Corvallis, Oreg. It should be understood however, that other means for automatically determining the user's physical location may be used, such as information from the user's cellular telephone. Alternatively, the GPS system could be replaced by the user selectively inputting his or her location at the time of detection into the computer via a keyboard or touch screen.

As mentioned above, each computer 20 or 20' in the monitoring motor vehicle 10 or 10', respectively, is connected to a means capable of detecting speed detecting equipment 15, 15', respectively, operated by local law enforcement personnel. In the first motor vehicle 10, the speed detecting equipment means is a standard radar or laser beam detector 17, which is incorporated by reference herein. During use, the detector 17 is coupled to the computer 20, which transmits a detection signal directly to a port on the computer 20 when detection occurs. An optional confirmation button 27 may be connected to the computer 20 which is used by the user 9 to visually confirm that the detection signal was generated by the speed detecting equipment operated nearby.

In the second motor vehicle 10', the speed detecting equipment means for detecting speed detecting equipment 15' is the user 9' who uses his or her eyes 18 to visually detect the presence of speed detecting equipment 15'. When the individual 9' makes visual contact with a local traffic control officer operating speed detecting equipment 15', he or she activates a detection button 22 which generates and transmits a detection signal to the computer 20'.

Loaded into the memory of each computer 20, 20' in the monitoring motor vehicles 10, 10', respectively, is a communication/interface software program 25 designed to associate the detection signal transmitted by the detector 17 or the detection button 22, the physical location information from the GPS, and the date and time information available from the BIOS of the computer 20, 20'. When the computers 20, 20' are connected to the wide area network 45, the software program 25 automatically downloads the detection signal, the optional confirmation signal, the location information, and time information to the central server 50. The communication/interface software program 25 may include an optional function which enables the users 9, 9' to selectively input the date, time and location information of the speed detecting equipment or any other information requested by the database 60.

The system 5 is designed to be used by authorized users who do not input information but merely download information from the central server 50. The system 5 is controlled by an operator who controls the central server 50 and assigns passwords to users granting them access to the database 60. The operator also enlists users who serve as users 9, 9' of monitoring motor vehicles 10, 10' as shown in FIG. 1.

The first step in using the system 5 is identifying the computers 20, 20', 20", 20'" when connected to the central server 50. This is accomplished by determining the computer's ID information 52. If the central server 50 is also the user's service provider to the wide area network 45 and a previously established account has been set up on the central server 50, the numerical or temporary address assigned to the user by the service provider may be used as the computer's ID information 52. If a computer 20, 20', 20", or 20'" does not have a previously established account on the central server 50, a client software program 54 supplied by the operator, must be loaded into the computer 20, 20', 20", or 20'" and used to connect it to the central server 50. During use, the user's personal information is entered into the client software program 54 by the user which is automatically transmitted to the central server 50 when the computer 20, 20', 20", or 20'" connects to the central server 50. The central server 50 then temporarily assigns the ID information 52 to the computer 20, 20', 20", or 20'".

After the user ID information 52 has been verified by the central server 50, the user of the computer 20, 20' 20" or 20'" may download speed trap information from the central server 50. Typically, this requires the user to submit the name of a specific roadway or a specific address. The central server 50 then responds by sending the user speed traps information submitted recently by monitoring motor vehicles 20 or 20'.

The authorized users 11, 13 may be located in non-monitoring vehicles 12 or at a stationary location 14, respectively, who merely want updated speed trap information before or during travel. For these users 11, 13, the speed detecting equipment detector 17, detection button 22, GPS receiver 28, and optional confirmation key 27 are not used. For non-monitoring motor vehicles 12, a wireless modem 24" is used to connect to the wireless communication network 35. As mentioned above, for non-monitoring, stationary locations 14, a standard analog modem 32 may be used to connect to a standard telephone network, which connects to the wide area network 35.

EXAMPLE 1

A user 9 has a motor vehicle 10 with a computer 20 coupled to a wireless modem capable of connecting via a wireless communication network 35 and to a wide area network 45, such as the INTERNET. Recently, the user 9 has signed up with a speed trap information service 5. A monitoring vehicle 10 that transmits speed detection equipment detection signals to a central server 50 connected to the wide area network 45. In order to be a monitoring motor vehicle 10, the motor vehicle 10 is equipped with a radar detector 17 and a GPS receiver 28. A communication/interface software program 54 has also been loaded into the computer's memory, which collects and transmits the information to the central server 50.

When the user 9 travels, the system 5 is continuously activated so that when the radar detector 17 detects speed detection equipment 15, the location, date and time of detection is automatically uploaded to the central server 50. When the user 9 wants to download information regarding speed detection equipment 15 located in a specific area he or she is traveling, the user 9 may input the address of the specific area into the central server 50 and download the information. Alternatively, the user may input a request that he receive constantly updated information regarding speed detection equipment 15 along a specific roadway between locations. The information from the GPS receiver 28 may be downloaded to the central server 50 to inform the central server 50 of user's precise location at any moment.

EXAMPLE 2

A second user 9' also has a motor vehicle 10' with a built-in computer 20' coupled to a wireless modem 24 capable of connecting via a wireless communication network 35 to a wide area network 45. The second user 9' also has signed up as a monitoring motor vehicle 10' with the same service as the first user 9, only the second user's motor vehicle 10' is equipped with manual detection button 22 that he uses in place of a radar detector 17. When the user 9' makes visual contact with a local traffic control officer operating a radar detector 15' or similar equipment, he or she immediately activates the detection button 22 to inform the central server 50 that visual contact has occurred at a specific location and time. The second user 9' too, may download information regarding speed detection equipment located in roadways in a specific area.

EXAMPLE 3

A third user 11 has a motor vehicle 12 with a built-in computer 20" coupled to a wireless modem 24" capable of connecting via a wireless communication network 35 to the wide area network 45. The third user 11 has signed up as a non-monitoring motor vehicle 12 which enables him or her to download past, present or future speed trap information inputted by monitoring motor vehicles 9 or 9'. To access this information, the third user 11 must log into the central server 50 and input the location address or specific roadway he or she is currently or intends to travel. The information can then be immediately and continuously downloaded as he or she travels.

EXAMPLE 4

A fourth user 13 has set up an account for speed trap information service 5 which enables him or her to download past, present, and possible future speed trap information from his or her home or office. The fourth user 13 uses a computer 20''' that is coupled to an analog modem 32 which is connected to a landline telephone network 38 and to the wide area network 45. When the user 13 is connected to the wide area network 45, he or she is able to log onto the central server 50 for the speed trap information service and request specific location for past, present, and possible future speed trap information. With this information, the user 13 is able to plan her route from his or her current location to her final destination.

In compliance with the statute, the invention described herein has been described in language more or less specific as to structural features. It should be understood, however, that the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A speed trap information system, comprising:
   a. at least one motor vehicle;
   b. a wide area network;
   c. an electronic device located in said motor vehicle;
   d. a means for detecting speed detecting equipment, said means being connected to said electronic device;
   e. physical location means to determine the specific location of said motor vehicle when a speed detection signal is produced by said means for detecting speed detecting equipment;
   f. a wireless communication means coupled to said electronic device enabling said electronic device to connect to said wide area network; and,
   g. a central server connected to said wide area network, said central server capable of receiving and storing said speed detecting equipment information and physical location information from said electronic device and selectively transmitting said information over said wide area network and to authorized users.

2. The speed trap information system as recited in claim 1, wherein said means for detecting speed detecting equipment is a radar detector.

3. The speed trap information system as recited in claim 1, wherein said means for detecting speed detecting equipment is a laser detector.

4. The speed trap information system, as recited in claim 1, wherein said means for detecting speed detecting equipment is a manual button attached to said electronic device capable of being activated by a user when visual detection of speed detecting equipment occurs.

5. The speed trap information system as recited in claim 1, wherein said physical location detection means is a GPS receiver.

6. The speed trap information system as recited in claim 1, wherein said wireless communication means is a wireless modem connected to said electronic device.

7. The speed trap information system as recited in claim 1, wherein said central server is the network service provider for the user of said electronic device.

8. The speed trap information system as recited in claim 1, further including means for visually confirming the speed detection signal and transmitting said visual confirmation information to said central server.

9. A speed trap information system, comprising:
   a. at least one motor vehicle;
   b. a wide area network;
   c. an electronic device located in said motor vehicle;
   d. means for detecting speed detecting equipment, said means being connected to said electronic device;
   e. a GPS receiver coupled to said electronic device capable of determining the physical location of said motor vehicle when speed detecting equipment is detected by said means for detecting speed detecting equipment;

f. a wireless modem coupled to said electronic device enabling said electronic device to connect to said wide area network; and, g. a central server connected to said wide area network, said central server capable of receiving and storing said speed detecting equipment information and physical location information from said electronic device.

10. A speed trap information system as recited in claim 9, wherein said means for detecting speed detecting equipment is a radar detector.

11. A speed trap information system as recited in claim 9, wherein said means for detecting speed detecting equipment is a laser detector.

12. A speed trap information system as recited in claim 9, wherein said means for detecting speed detecting equipment is a manual button connected to said electronic device.

13. A speed trap information system as recited in claim 9, further including a manual operated confirmation button coupled to said electronic device to verify the signal produced by said means for detecting speed detecting equipment.

14. A speed trap information system, comprising:

a. a plurality of monitoring speed trap motor vehicles each including means for detecting the operation of speed detecting equipment operated nearby and including means for determining the physical location of said motor vehicle when detection occurs, each said monitoring motor vehicle including means for transmitting detection information and physical location information to a wide area network;

b. a wide area network;

c. a central server connected to said wide area network capable of receiving said detection and location information from said monitoring motor vehicles and creating a database thereof; and, d. means for connecting to said wide area network and downloading selective detection and location information from said database on said central server.

15. The speed trap information system as recited in claim 14, wherein said means for detecting speed detecting equipment is a laser detector.

16. The speed trap information system, as recited in claim 15, wherein said means for detecting speed detecting equipment is a manual button attached to an electronic device capable of connecting to said wide area network.

17. The speed trap information system as recited in claim 15, wherein at least one user of said system is located in a motor vehicle and connected to said wide area network and central server through said a wireless communication network.

18. The speed trap information system as recited in claim 15, wherein at least one user of said system is located in a fixed position and connected to said wide area network and said central server through a landline communication network.

19. The speed trap location system, as recited in claim 16, wherein each said speed trap monitoring vehicle includes means to determine the time of day detection occurs.

* * * * *